United States Patent [19]

Turner

[11] Patent Number: 4,636,039

[45] Date of Patent: Jan. 13, 1987

[54] NONUNIFORMITY OF FRINGE FIELD CORRECTION FOR ELECTRO-OPTIC DEVICES

[75] Inventor: William D. Turner, San Marino, Calif.

[73] Assignee: Xerox Corporation, Stamford, Conn.

[21] Appl. No.: 722,557

[22] Filed: Apr. 12, 1985

[51] Int. Cl.$^4$ .................... G02F 1/03; G01D 15/14
[52] U.S. Cl. .................................... 350/356; 346/160
[58] Field of Search ................. 350/355, 356; 346/160

[56] References Cited

U.S. PATENT DOCUMENTS

| | | | |
|---|---|---|---|
| 4,370,029 | 1/1983 | Sprague et al. | 350/355 |
| 4,450,459 | 5/1984 | Turner et al. | 350/356 |
| 4,482,215 | 11/1984 | Sprague et al. | 350/356 |
| 4,538,883 | 9/1985 | Sprague et al. | 350/356 |

*Primary Examiner*—Bruce Y. Arnold
*Attorney, Agent, or Firm*—Leonard Zalman

[57] ABSTRACT

Additional control in a differentially-encoded printer utilizing an electro-optic element is achieved by normalizing or equalizing the strength of the fringe fields. Such normalization is provided by applying analog voltages to the adjacent electrodes in addition to the encoded data sample voltages. Specifically, normalization of the strength of the fringe fields is achieved by characterizing the interaction between each adjacent pair of electrodes by measuring the efficiency amplitude of the fringe field caused by each adjacent pair of electrodes when a test voltage is applied to alternate electrodes and converting efficiency amplitude to an analog voltage for each electrode by a transfer function plotting efficiency amplitude versus voltage, storing the analog voltage for each electrode and adding the analog voltage for each electrode to the data sample voltage for that electrode to provide at the electrodes a full set of voltage differences that will provide normalization of the strength of the fringe fields associated with one complete data scan line.

1 Claim, 10 Drawing Figures

NONUNIFORMITY OF FRINGE FIELD CORRECTION FOR ELECTRO-OPTIC DEVICES

BACKGROUND OF THE INVENTION

This invention relates to electro-optic devices and, more particularly, to proximity coupled light valves for electro-optic line printers and the like.

It has been shown that an electro-optic element having a plurality of individually addressable electrodes can be used as a multi-gate light valve for line printing. As is known, almost any optically transparent electro-optical material can be used as the electro-optic element of such a light valve. The most promising materials now appear to be $LiNbO_3$ and $LiTaO_3$, but there are other materials which qualify for consideration, including BSN, KDP, $KD^xP$, $Ba_2NaNb_5O_{15}$ and PLZT. In any event, the electrodes of such a light valve are intimately coupled to the electro-optic element and are distributed in non-overlapping relationship widthwise of the electro-optic element (i.e., orthogonally relative to its optical axis), typically on equidistantly separated centers so that there is a generally uniform interelectrode gap spacing. The electrodes of an electro-optic device, such as a multi-gate light valve, may be fabricated on a suitable substrate and pressed against or held very close to the electro-optic element to provide what is referred to as "proximity coupling".

To perform line printing with a multi-gate light valve of the foregoing type, a photosensitive recording medium, such as a xerographic photoreceptor, is exposed in an image configuration as it advances in a cross line direction (i.e., a line pitch direction) relative to the light valve. More particularly, to carry out the exposure process, a sheetlike collimated light beam is transmitted through the electro-optic element of the light valve, either along its optical axis for straight through transmission or at a slight angle relative to that axis for total internal reflection. Furthermore, successive sets of digital bits (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, which are coupled into the electro-optic element through an air gap in proximity coupled devices, in turn, cause localized variations in the refractive index of the electro-optic element within an interaction region (i.e., a light beam illuminated region of the electro-optic element which is subject to being penetrated by the electric fields). Thus, the phase front or polarization of the light beam is modulated (hereinafter generically referred to as "p-modulation" of the light beam) in accordance with the data samples applied to the electrodes as the light beam passes through the interaction region. Schilieren readout optics may be used to convert a phase front modulated light beam into a light beam having a correspondingly modulated intensity profile. For example, the phase front modulated light beam may be imaged onto the recording medium by central dark field or central bright field imaging optics. Alternatively, if the input light beam is polarized, a polarization modulation to intensity modulation conversion process may be performed by passing the polarization modulated output beam through a polarization analyzer. In more generic terms, the p-modulation of the light beam is converted into a correspondingly modulated intensity profile by using "p-sensitive readout optics" to image or project (hereinafter collectively referred to as imaging) the light beam onto the recording medium.

In order to use only one electrode per picture element, a differential encoding scheme may be used. With such a scheme, the intensity pattern to be recorded across a scan line is differentially encoded so that any picture element to be turned on is represented as a voltage difference between two neighboring electrodes independent of sign, and any picture element to be turned off is represented as a common voltage between two electrodes independent of magnitude.

SUMMARY OF THE INVENTION

In the ideal case, all of the localized fringe fields will have the same strength in the interaction region. However, in practice, due to variations in the air gap due to surface roughness of the electrodes and the electro-optic element, possible defects in those surfaces, entrapped dust particles, and variations in the dimensions of the electrodes, there may be significant variations in the strengths of the fringe fields. Such variations are objectionable if the printing is to be of high precision with good edge performance and if half-tone printing is desired.

Therefore, in accordance with this invention, additional control in a differentially-encoded printing process is achieved by normalizing or equalizing the strength of the fringe fields. Such normalization is provided by applying analog (variable) voltages to the adjacent electrodes in addition to the encoded data sample voltages. Specifically, normalization of the strength of the fringe fields is achieved by characterizing the interaction between each adjacent pair of electrodes by measuring the efficiency amplitude of the fringe field caused by each adjacent pair of electrodes when a test voltage is applied to alternate electrodes and converting efficiency amplitude to an analog voltage for each electrode by a transfer function plotting efficiency amplitude versus voltage, storing the analog voltage for each electrode and adding the analog voltage for each electrode to the data sample voltage for that electrode to provide at the electrodes a full set of voltage differences that will provide normalization of the strength of the fringe fields associated with one complete data scan line.

BRIEF DESCRIPTION OF THE DRAWINGS

Still other features and advantages of this invention will become apparent when the following detailed description is read in conjunction with the attached drawings in which.

DETAILED DESCRIPTION OF THE PREFERRED EMBODIMENT

While the invention is described in some detail hereinbelow with reference to certain illustrated embodiments, it is to be understood that there is no intent to limit it to those embodiments. On the contary, the aim is to cover all modifications, alternatives and equivalents falling within the spirit and scope of the invention as defined by the appended claims.

Figure 1:
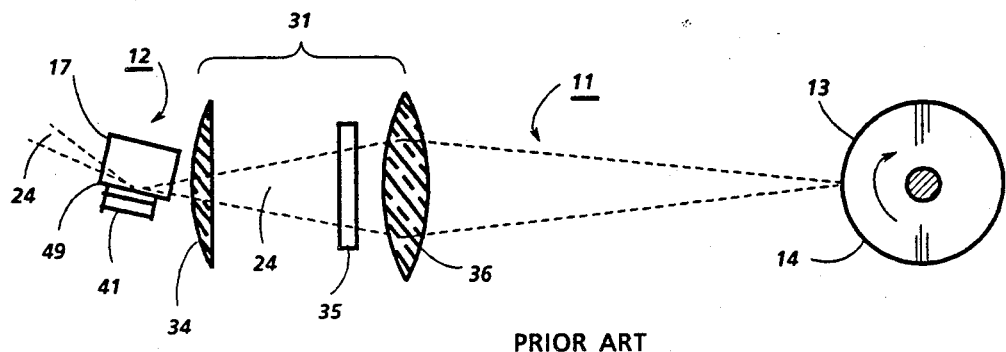
FIG. 1 is a schematic side view of an electro-optic line printer including a proximity coupled TIR multi-gate light valve.
Figure 2:
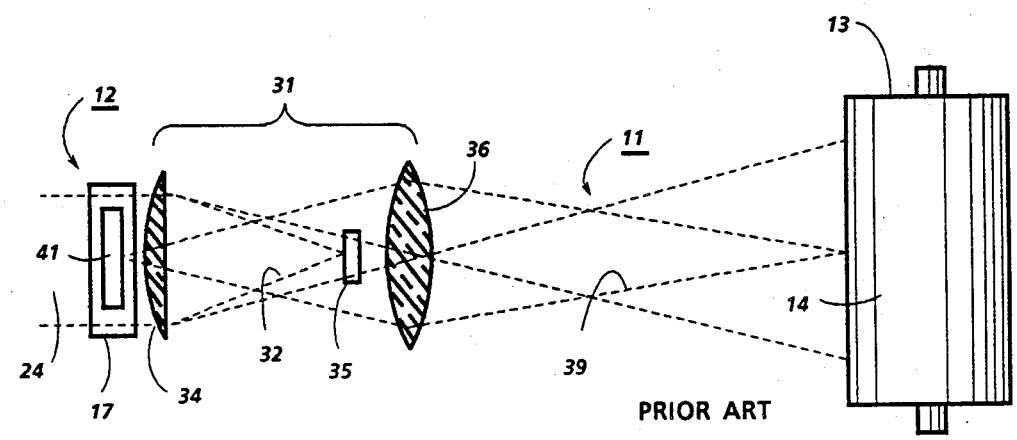
FIG. 2 is a schematic bottom plan view of the electro-optic line printer shown in FIG. 1.

Turning now to the drawings, and to this point especially to FIGS. 1 and 2, there is an electro-optic line printer 11 comprising a multi-gate light valve 12 for exposing a photosensitive recording medium 13 in an image configuration. The recording medium 13 is depicted as being a photoconductively coated xerographic drum 14 which is rotated (by means not shown) in the direction of the arrow. It nevertheless will be evident that there are other xerographic and non-xerographic recording media that could be used, including photoconductively coated xerographic belts and plates, as well as photosensitive film and coated paper in web or cut sheet stock form. The recording medium 13 should, therefore, be visualized in the generalized case as being a photosensitive medium which is exposed in an image configuration while advancing in a cross line or line pitch direction relative to the light valve 12.

Figure 3:
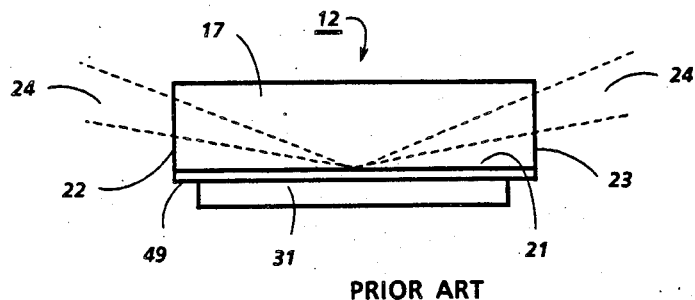
FIG. 3 is an enlarged side view of a TIR light valve for the electro-optic line printer of FIGS. 1 and 2.
Figure 4:
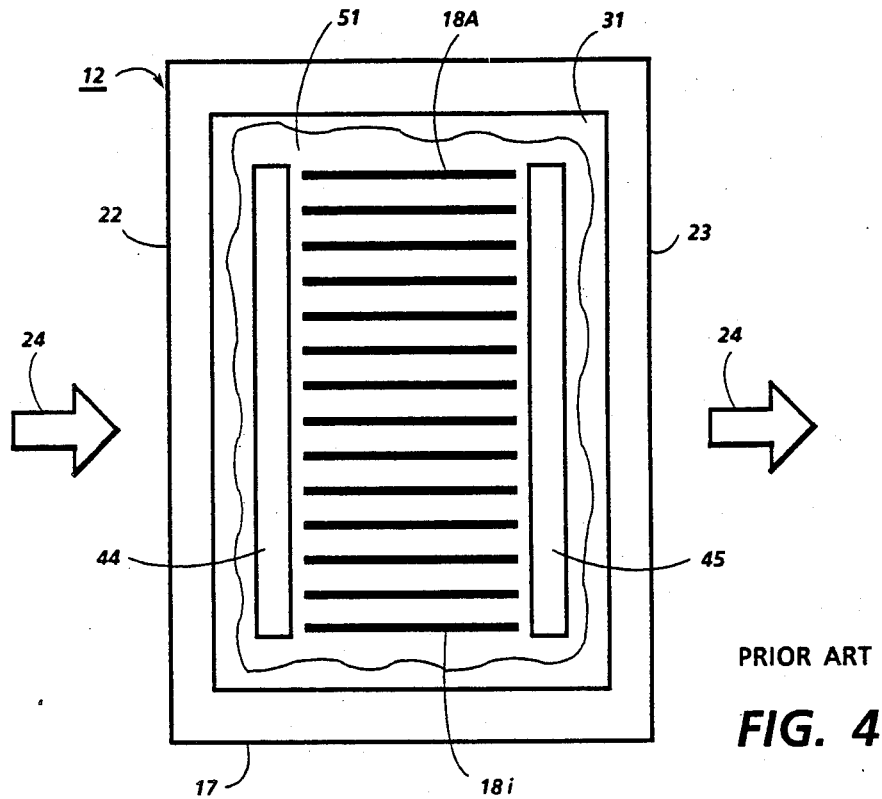
FIG. 4 is an enlarged cutaway bottom view of the TIR light valve of FIG. 3 showing a pattern of individually addressable electrodes.

As shown in FIGS. 3 and 4, the light valve 12 includes an electro-optic element 17 and a plurality of individually addressable electrodes 18a-18i. For a total internal reflection (TIR) mode of operation as illustrated, the electro-optic element 17 typically is a y cut crystal of, say LiNbO3, having an optically polished reflecting surface 21 which is integral with and disposed between optically polished input and output faces 22 and 23, respectively. The electrodes 18a-18i are intimately coupled to the electro-optic element 17 adjacent the reflecting surface 21 and are distributed across essentially the full width thereof. Typically, the electrodes 18a-18i are 1-30 microns wide and are on centers which are more or less equidistantly separated to provide a generally uniform interelectrode gap spacing of 1-30 microns. In this particular embodiment, the electrodes 18a-18i extend generally parallel to the optical axis of the electro-optic element 17 and have projections of substantial length along that axis. Alternatively, the electrodes 18a-18i could be aligned at the so-called Bragg angle relative to the optical axis of the electro-optic element 17. As will be appreciated, if the electrodes 18a-18i are aligned parallel to the optical axis of the electro-optic element 17, the light valve 12 will produce a diffraction pattern which is symmetrical about the zero order diffraction component. If, on the other hand, the electrodes 18a-18i are at the Bragg angle relative to the optical axis of the electro-optic element 17, the light valve 12 will produce an asymmetrical diffraction pattern.

Briefly reviewing the operation of the line printer 11 depicted in FIG. 1, a sheet-like collimated beam of light 24 from a suitable source, such as a laser (not shown), is transmitted through the input face 22 of the electro-optic element 17 at a grazing angle of incidence relative to the reflecting surface 21. The light beam 24 is brought to a wedge shaped focus (by means not shown) at approximately the center line of the reflecting surface 21 and is totally internally reflected therefrom for subsequent transmission through the output face 23. As will be seen, the light beam 24 illuminates substantially the full width of the electro-optic element 17 and is phase front modulated while passing therethrough in accordance with the differentially encoded data samples applied to the electrodes 18a-18i.

Figure 5:
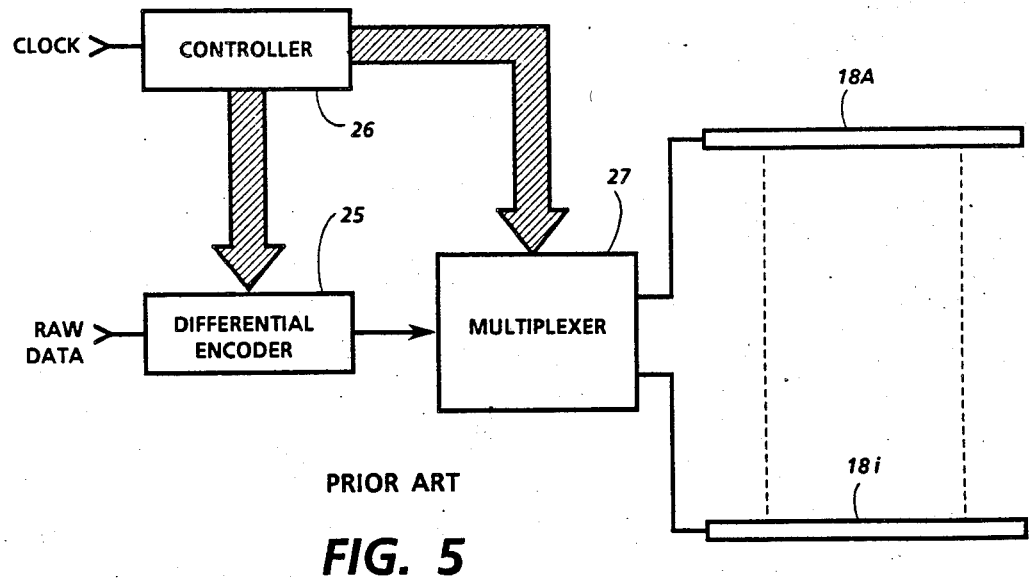
FIG. 5 is a simplified block diagram of a system for applying differentially encoded serial input data to the individually addressable electrodes of the electrode pattern shown in FIG. 4.

More particularly, as shown in FIG. 5, serial input data samples, which represent picture elements for successive lines of an image, are applied to a differential encoder 25 at a predetermined data rate. The encoder 25 differentially encodes the input samples on a line-by-line basis in response to control signals from a controller 26, and a multiplexer 27 ripples the encoded data samples onto the electrodes 18a-18i at a ripple rate which is matched to the data rate in response to further control signals from the controller 26. The input data may, of course, be buffered (by means not shown) to match the input data rate to any desired ripple rate. Additionally, the input data may be processed (by means also not shown) upstream of the encoder 25 for text editing, formatting or other purposes, provided that the data samples for the ultimate image are applied to the encoder 25 in adjacent picture element sequence.

Differential encoding is described in substantial detail in a copending and commonly assigned U.S. patent application of W. D. Turner et al, which was filed Sept. 17, 1980 under Ser. No. 187,916 on "Differential Encoding for Fringe Field Responsive Electro-Optic Line Printers." Thus, it will suffice to note that each differentially encoded data sample, other than the first sample for each line of the image, has a magnitude whose difference from the previous differentially encoded data sample corresponds to the magnitude of a respective input data sample. The first sample for each line of the image is referenced to a common reference potential, such as ground. Thus, all picture elements are faithfully represented by the electrode to electrode voltage drops that are produced in response to the differentially encoded data.

Figure 6:
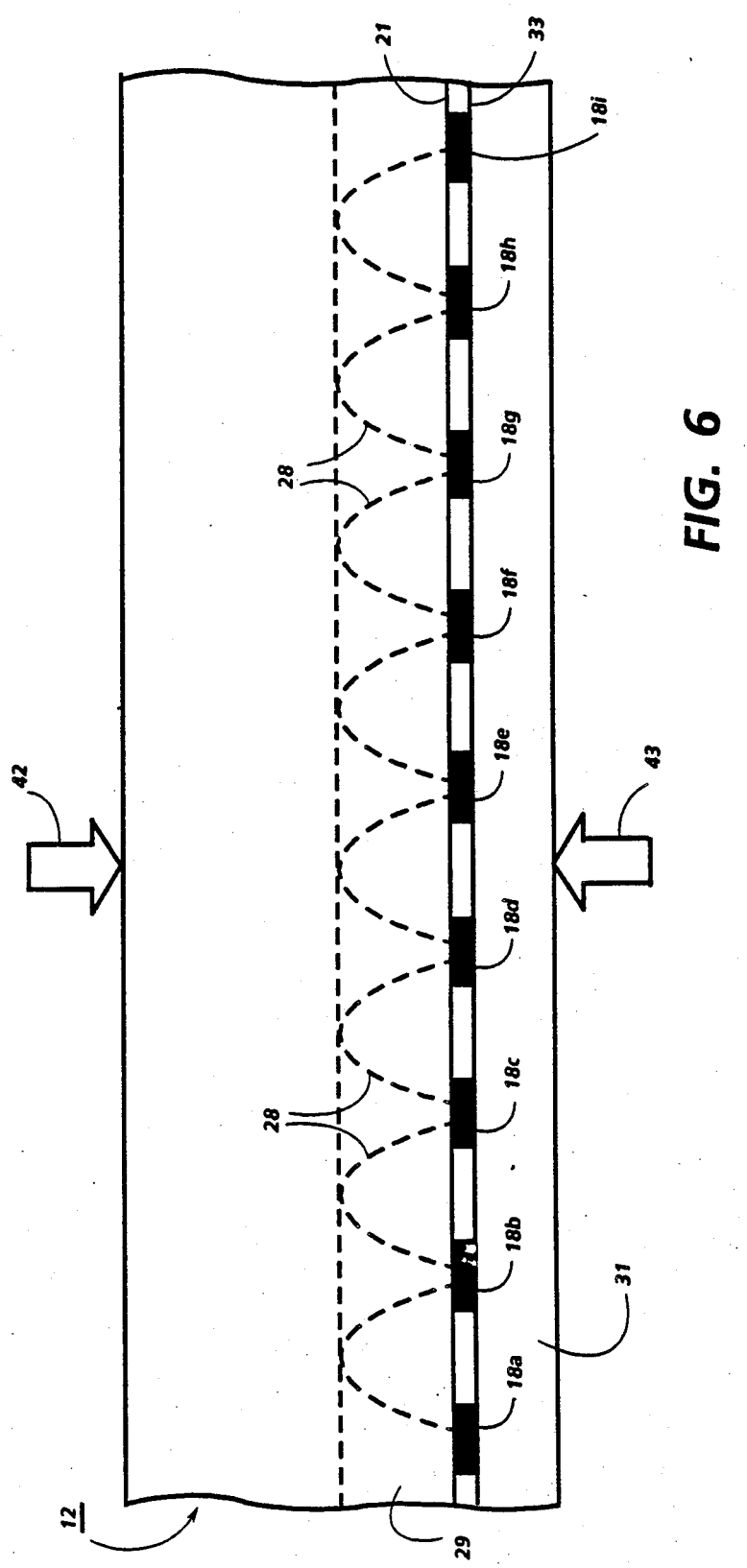
FIG. 6 is an enlarged and fragmentary sectional view of the fringe fields of an idealized TIR light valve of the type shown in FIG. 3 to better illustrate the present invention.

Referring to FIG. 6, the electrode to electrode voltage drops create localized fringe fields 28 within an interaction region 29 of the electro-optic element 17, and the fringe fields 28 cause localized variations in the refractive index of the electro-optic element 17 widthwise of the interaction region 29. In the ideal case shown, the localized fringe fields are of the same strengh. The voltage drop between any adjacent pair of electrodes determines the refractive index for the portion of the interaction region 29 which bridges between those two electrodes. Hence, the refractive index variations within the interaction region 29 faithfully represent the input data samples appearing on the electrodes 18a-18i in differentially encoded form at any given point in time. It therefore follows that the phase front of the light beam 24 (FIG. 3) is sequentially spatially modulated in accordance with the data samples for successive lines of the image as the light beam 24 passes through the interaction region 29 of the electro-optic element 17.

Returning for a moment to FIGS. 1 and 2, to expose the recording medium 13 in an image configuration, there suitably are Schlieren central dark field imaging optics 20 which are optically aligned between the electro-optic element 17 and the recording medium 13 for imaging the light beam 24 onto the recording medium 13. The imaging optics 20 convert the spatial phase front modulation of the light beam 24 into a correspondingly modulated intensity profile and provide any magnification that is required to obtain an image of a desired width. To accomplish that, the illustrated imaging optics 20 include a field lens 34 for focusing the zero order diffraction components 40 of the phase front modulated light beam 24 onto a central stop 35 and an imaging lens 36 for imaging the higher order diffraction components onto the recording medium 13; i.e., the image plane for the light valve 12. The field lens 34 is optically aligned between the electro-optic element 17 and the stop 35 so that substantially all of the zero order components 40 of the light beam 24 are blocked by the stop 35. The higher order diffraction components of the light beam 24 scatter around the stop 35 and are collected by the imaging lens 36 which, in turn, causes them to fall onto the light valve image plane defined by the recording medium 13. Of course, other p-sensitive read out optics could be used to convert the phase front or polarization modulated light beam provided by the electro-optic element 17 into a light beam having a correspondingly modulated intensity profile.

To summarize, as indicated in FIG. 2 by the broken lines 39, each neighboring pair of electrodes cooperates with the electro-optic element 17 and with the p-sensitive readout optics 20 to effectively define a local modulator for creating a picture element at a unique, spatially predetermined position along each line of the image. Accordingly, the number of electrodes 18a-18i determines the number of picture elements that can be printed per line of the image. Moreover, by sequentially applying successive sets of differentially encoded data samples to the electrodes 18a-18i while the recording medium 13 is advancing in a cross line direction relative to the light valve 12, successive lines of the image are printed.

Referring again to FIG. 6, the electrodes 18a-18i are proximity coupled to the electro-optic element 17. To that end, a clamp, which is schematically represented by the arrows 42 and 43, is engaged with the electro-optic element 17 and with the silicon integrated circuit 31 to urge the electrodes 18a-18i into close contact with the reflecting surface 23 of the electro-optic element 17. Alternatively, the integrated cicuit 31 could be bonded to the electro-optic element 17 by an adhesive or by suction.

Heretofore, in this discussion, it was assumed that all of the localized fringe fields have the same strength in the interaction region, as shown in FIG. 6. However, in practice, due to variations in the air gap due to surface roughness of the electrodes and the electro-optic element, possible defects in those surfaces, entrapped dust particles, and variations in the dimensions of the electrodes, there may be significant variations in the strengths of the fringe fields. Such variations are objectionable if the printing is to be of high precision with good edge performance and if half-tone printing is desired.

Figure 7:
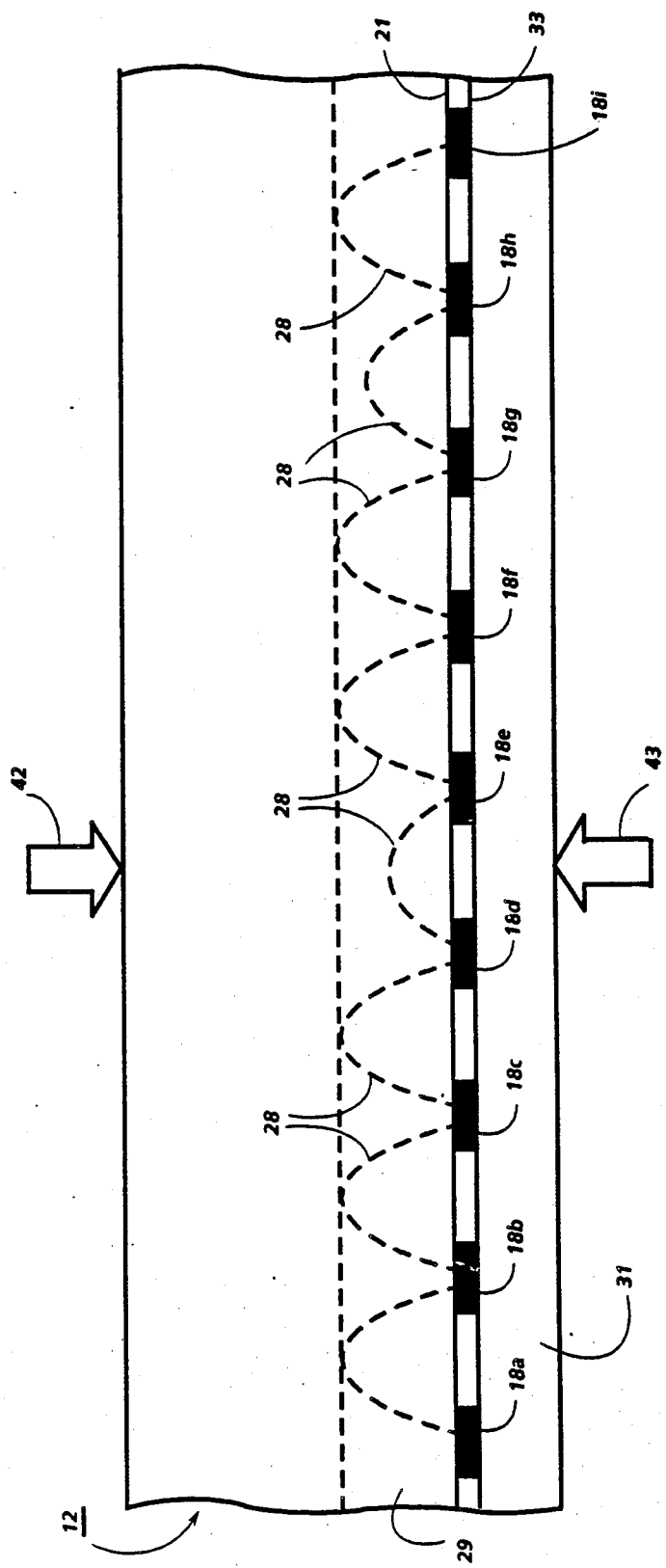
FIG. 7 is an enlarged and fragmentary sectional view of the fringe fields of a TIR modulator without equalization in accordance with the invention.
Figure 8:
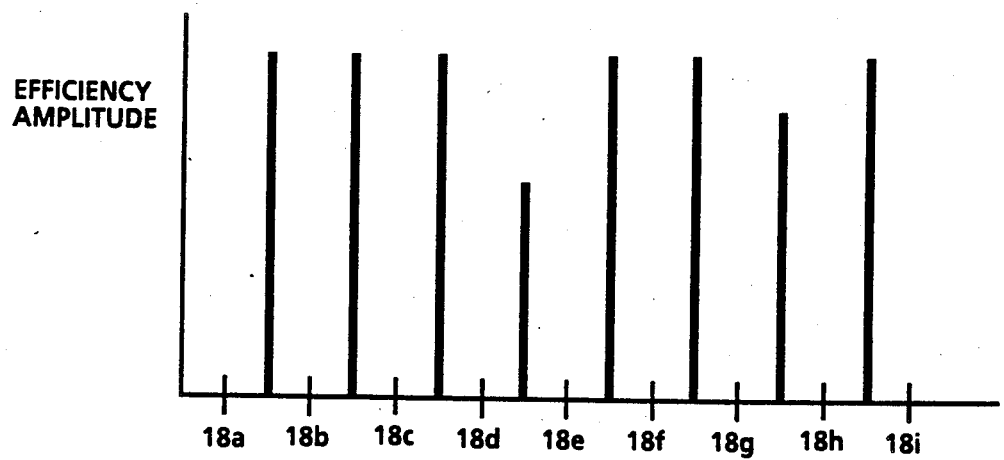
FIG. 8 is a chart of the efficiency amplitudes of the fringe fields depicted in FIG. 7.
Figure 9:
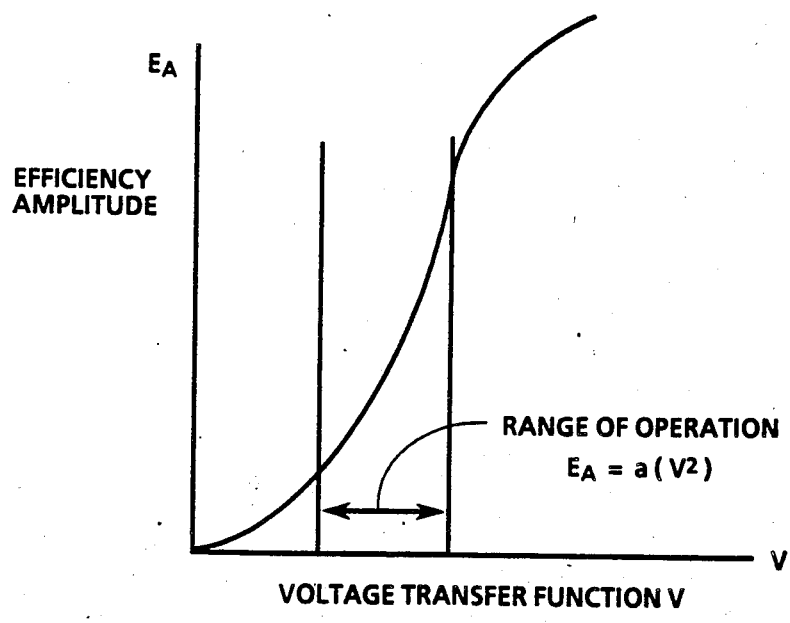
FIG. 9 is an efficiency amplitude versus voltage transfer function for the amplitudes of FIG. 8.

In accordance with this invention, additional contol in the differentially encoded printing process is achieved by normalizing or equalizing the strength of the fringe fields associated with the picture elements. Such normalization is initiated by applying the same voltage differential across adjacent pairs of the electrodes 18a-18i, such as by applying a test voltages of 10 volts to alternate electrodes and maintaining the other electrodes at a reference potential, such as ground, illuminating the element 17 with a sheet-like collimated beam of light at a grazing angle of incidence relative to the reflecting surface 21, and measuring in a conventional manner the intensity of the light output of each picture element defined by each adjacent pair of electrodes. Such intensity readings are indicative of the strength or efficiency of the individual fringe fields. FIG. 7 shows how the strengths of the fringe fields may vary with application of the test voltage, and FIG. 8 is a chart of the efficiency amplitudes of the fringe fields for adjacent pairs of the electrodes 18a-18i. Note that in FIG. 7 the fringe field caused by adjacent electrode pairs 18d and 18e and 18g and 18h are respectively one-half and three-fourths of the amplitude of the fringe fields produced by the other adjacent electrode pairs. Convolving the efficiency amplitudes with the amplitude efficiency versus voltage transfer function shown in FIG. 9 provides a new differential voltage for each pair of adjacent electrodes defining a picture element position. Since the smallest field amplitude shown in FIG. 7, that produced by electrodes 18d and 18e, is one-half the maximum field amplitude of the field produced by any other adjacent electrode pair, the maximum differential correction voltage associated with electrodes 18d and 18e will be twice that associated with any electrode pair producing maximum field amplitude. Thus, in the case shown in FIG. 7, equalized field strength is achieved by applying analog correction voltages to electrodes 18a-18i as follows:

| 18a | 18b | 18c | 18d | 18e | 18f | 18g | 18h | 18i |
|---|---|---|---|---|---|---|---|---|
| 5 v | 0 | 5 v | 0 | 10 v | 5 v | 0 | 6.6 v | 1.6 v |

In the example given, only two fringe field strengths are different from the maximum. In practice, many of the fringe field strengths will be different. For example, where the $\Delta V$ between each adjacent pair of electrodes 18a-18i needed to provide equal fringe field amplitudes is as shown below:

| 18a | 18b | 18c | 18d | 18e | 18f | 18g | 18h | 18i |
|---|---|---|---|---|---|---|---|---|
| $\Delta V$ | 1.0 | 1.0 | 0.9 | 0.8 | 1.2 | .7 | 1.0 | 0.9 | the following three sets of differential voltages will provide the desired equalization of fringe field amplitudes:

| 18a | 18b | 18c | 18d | 18e | 18f | 18g | 18h | 18i |
|---|---|---|---|---|---|---|---|---|
| 1 | 0 | 1.0 | 0.1 | 0.9 | 2.1 | 1.4 | 0.4 | 1.3 |
| 0 | 1 | 0 | 0.9 | 1.7 | 0.5 | 1.2 | 0.2 | 1.1 |
| 1 | 0 | 1 | 1.9 | 1.1 | 2.3 | 1.6 | 0.6 | 1.2 |

Figure 10:
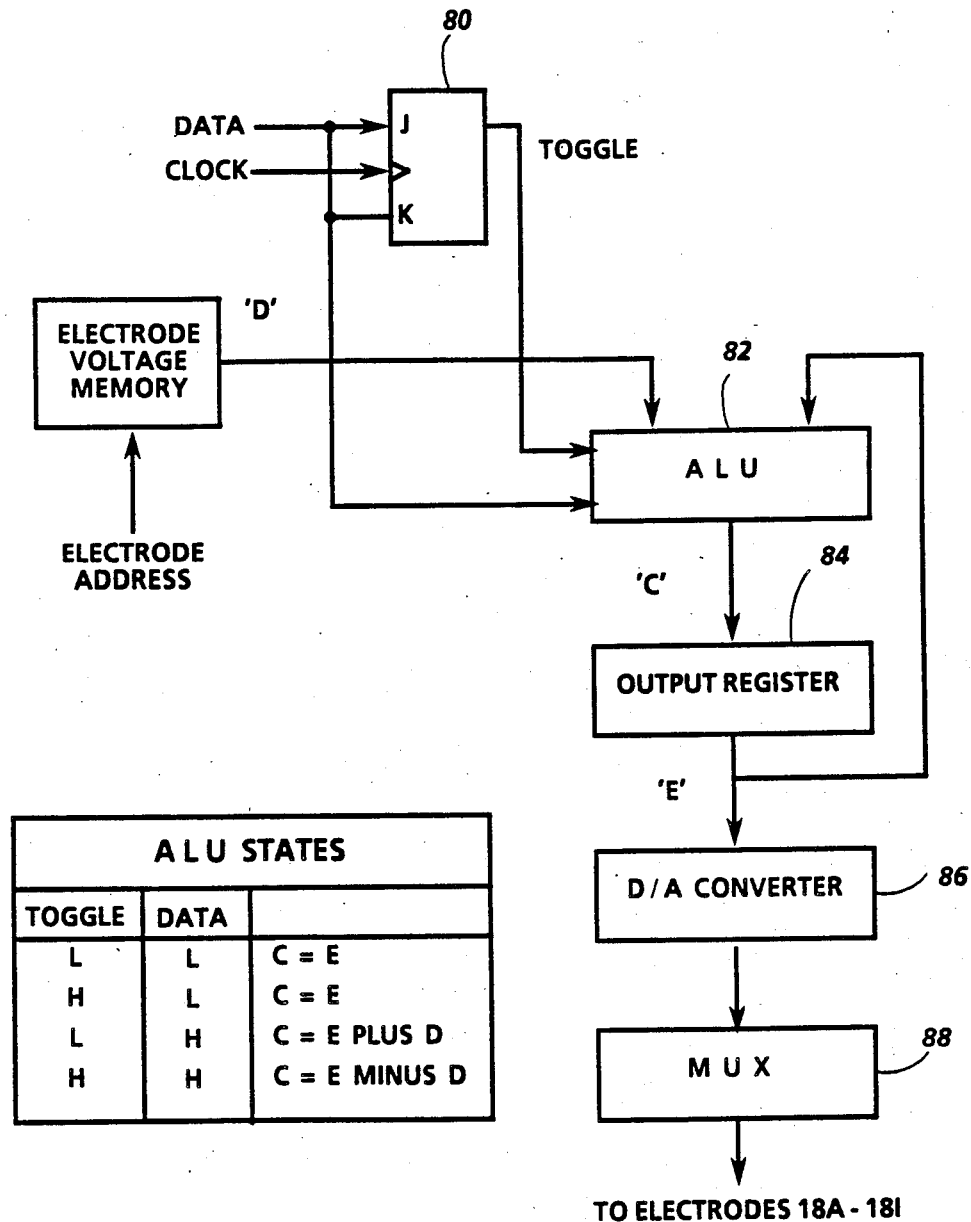
FIG. 10 is a simplified block diagram for a system for providing field normalized differentially encoded serial input data to the electrodes of the electrode pattern shown in FIG. 4.

The differential voltages needed for equalization of the fringe field amplitudes are stored and added to the data sample voltages for each line as that line is being printed. FIG. 10 shows a modification of the circuit of FIG. 5 for providing for the addition of such equalization voltages to the data sample voltages.

Referring specifically to FIG. 10, the raw digital data and a system clocking signal are supplied to a JK flip-flop 80 connected as a T or toggle flipflop. Flipflop 80 will change its state every time a data "1" (high voltage) is received but will remain unchanged when a data "0" (low voltage) is received. The toggle output and the digital data are supplied to an arithmatic logic unit 82 which also receives electrode field correction voltages "D" from an electrode voltage memory 84 which outputs in response to electrode address. Logic unit 82 can be, for example, a 4 bit ALU 74S281. The output "C" of arithmatic logic unit 82 is supplied to an output storage register 84 which provides an output "E" that is fed back to the unit 82 to provide an indication of the data to the previous electrode. Output "E" is also supplied to a digital to analog converter 86 that provides corrected electrode voltage for input into a multiplexer 88 that outputs to the electrodes 18a–18i. FIG. 10 also shows the ALU states. Each time that the toggle changes state the ALU does the opposite of what it did before. Thus, if the toggle is low and the data is low, C=E; if the toggle is high and the data is low, the condition C=E still exists; if the toggle is low and the data is high, C=E plus D; if the toggle is high and the data is high, C=E minus D. Thus, raw data is convolved with the correct electrode voltage from the memory and added to or subtracted from the previous electrode value to get the new electrode value.

I claim:

1. In an electro-optic device including an electro-optic element, a plurality of electrodes intimately coupled to said electro-optic element, and first means coupled to said electrodes for applying differentially encoded voltages to said electrodes, whereby electric fringe fields are created within said electro-optic element by adjacent pairs of said electrodes;

the improvement comprising second means for storing electric fringe field correction analog voltages for each of said electrodes, and third means coupled to said first means for receiving said differentially encoded voltages and coupled to said second means for receiving said analog correction voltages for providing that said electric fringe fields created within said electro-optic element by adjacent pairs of said electrodes are of equal strength.

* * * * *